United States Patent
Peng

(10) Patent No.: US 10,123,383 B1
(45) Date of Patent: Nov. 6, 2018

(54) LIGHT EMITTING DIODE DRIVING APPARATUS AND SIGNAL-ADJUSTING MODULE THEREOF

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 15/584,716

(22) Filed: May 2, 2017

(51) Int. Cl.
*H05B 33/08* (2006.01)

(52) U.S. Cl.
CPC ..... *H05B 33/0815* (2013.01); *H05B 33/0818* (2013.01); *H05B 33/0827* (2013.01); *H05B 33/0845* (2013.01)

(58) Field of Classification Search
CPC ................ H05B 33/08; H05B 33/0815; H05B 33/0818; H05B 33/0827; H05B 33/0839; H05B 33/0845; H05B 37/02
See application file for complete search history.

(56) References Cited

U.S. PATENT DOCUMENTS

| | | | |
|---|---|---|---|
| 8,373,448 B2 * | 2/2013 | Liu | H05B 33/0812 315/224 |
| 8,648,548 B2 * | 2/2014 | Sakai | H05B 33/0812 315/291 |
| 2014/0145646 A1 | 5/2014 | Zhang et al. | |
| 2014/0328427 A1 * | 11/2014 | Chang | H04L 27/10 375/271 |
| 2016/0309551 A1 * | 10/2016 | Koshimizu | H05B 33/0887 |

FOREIGN PATENT DOCUMENTS

| | | |
|---|---|---|
| CN | 201521844 U | 7/2010 |
| CN | 105472830 A | 4/2016 |
| CN | 105611684 A | 5/2016 |
| TW | 580798 B | 3/2004 |
| TW | I338443 B | 3/2011 |
| TW | 201141300 A | 11/2011 |
| TW | 201336346 A | 9/2013 |

* cited by examiner

*Primary Examiner* — Thai Pham
(74) *Attorney, Agent, or Firm* — Muncy, Geissler, Olds & Lowe, P.C.

(57) ABSTRACT

A signal-adjusting module applied to a light emitting diode driving apparatus includes an input terminal, an output terminal, a switch-control unit, and a switch. The switch-control unit is electrically connected to the input terminal for receiving an illuminant-control signal, and the switch is electrically connected to the input terminal, the output terminal, and the switch-control unit. The switch-control unit is configured to turn on the switch when a level of the illuminant-control signal reaches a first threshold level and turn off the switch when the level of the illuminant-control signal reaches a second threshold level, thus a transition time of the illuminant-control signal transits from an upper limit level to a lower limit level is decreased.

17 Claims, 7 Drawing Sheets

US 10,123,383 B1

LIGHT EMITTING DIODE DRIVING APPARATUS AND SIGNAL-ADJUSTING MODULE THEREOF

BACKGROUND

Technical Field

The present disclosure relates to a driving apparatus. More particularly, the present disclosure relates to a light emitting diode driving module with a signal-adjusting module for adjusting output color of light emitting diode strings.

Description of Related Art

A light emitting diode (LED) is a kind of semiconductor device, which exploits the property of direct-bandgap semiconductor material to convert electric energy into light energy efficiently and has advantages of long lifetime, high stability, and low power consumption and is widely used in indoor and outdoor illumination and outdoor landscape decoration Generally speaking, the LEDs are driven by a driving circuit. Thus, an LED-based luminaire (hereafter "the LED luminaire") includes a driving circuit and one or more LED strings, each LED string includes a plurality of LEDs electrically connected in series; the driving circuit electrically connected to the LED strings sends a driving signal formed by multiple interleaved high levels and low levels to drive the LEDs. The diameter and length of the line for connected LEDs are increased while the number of the LEDs in each LED string increases, which makes the parasitic capacitance on each LED string increase, leads to a misinterpretation of the driving signal. In order to solve the problem mentioned above, some manufactures increase the high-to-low or low-to-high transition speed of the driving signal (i.e., longer period of the high level or the low level). However, this process is relatively costly since less number of LEDs can be driven or the color variation speed of the LEDs is decreased.

SUMMARY

According to one aspect of the present disclosure, a signal-adjusting module applied to a light emitting diode driving apparatus for controlling a high-to-low transition time of an illuminant-control signal includes an input terminal, an output terminal, a switch-control unit, and a switch; the switch-control unit is electrically connected to the input terminal for receiving the illuminant-control signal, and the switch is electrically connected to the input terminal, the output terminal, and the switch-control unit. The illuminant-control signal is a pulse-width-modulation signal having an upper limit level and a lower limit level. The switch-control unit is configured to drive the switch to conduct when a level of the illuminant-control signal reaches a first threshold level, and the switch-control unit is further configured to drive the switch to cut off when the level of the illuminant-control signal reaches a second threshold level, thus a transition time of the illuminant-control signal transits from the upper limit level to the lower limit level is decreased. The first threshold level is greater than the first threshold level.

According to another aspect of the present disclosure, a light emitting diode driving apparatus receives an illuminant-control signal having an upper limit level and a lower limit level and configured to vary color of a plurality of light emitting diode strings includes the signal-adjusting module, a voltage regulator, and a driving module; the voltage regulator is arranged between the input terminal and the output terminal and electrically connected thereto, and the driving module is electrically connected to the signal-adjusting module and the light emitting diode strings.

The signal-adjusting module may effectively decrease the high-to-low transition time of the illuminant-control signal so as to increase the high-to-low transition speed.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
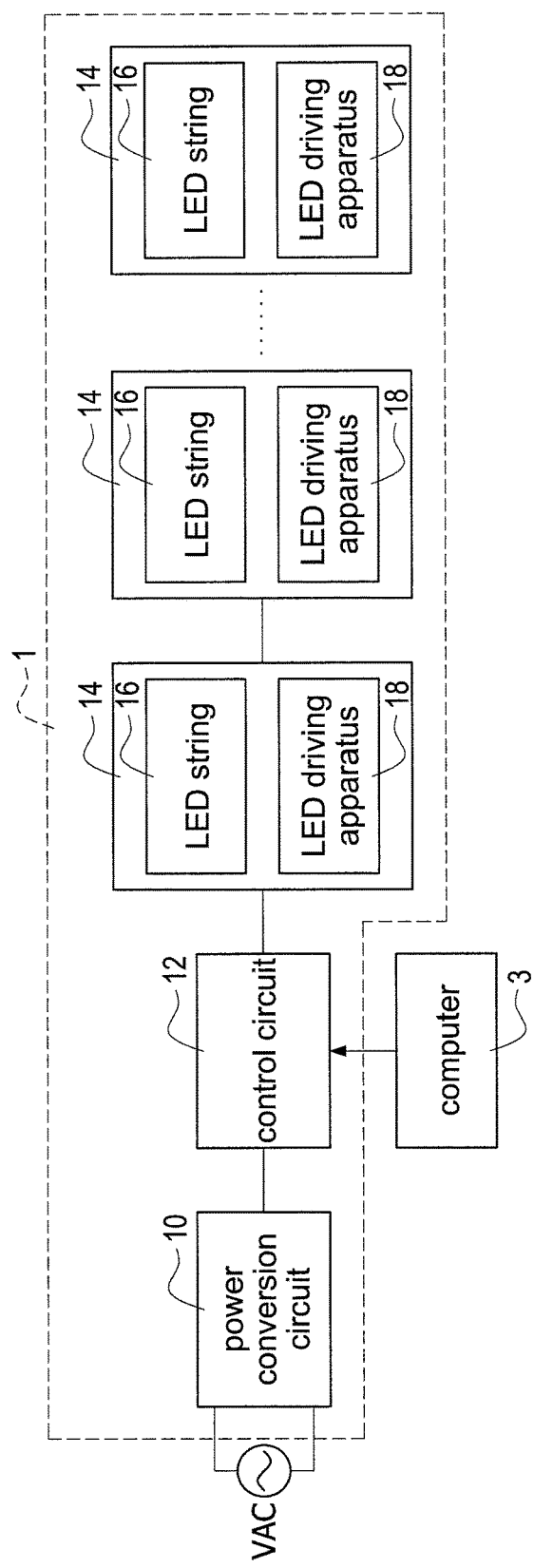
FIG. 1 is a circuit block diagram of a light emitting diode (LED) luminaire according to a 1st embodiment of the present disclosure.

Reference is made to FIG. 1, which is a circuit block diagram of a light emitting diode (LED) luminaire according to a 1st embodiment of the present disclosure. The LED luminaire 1 is electrically connected to an alternative current (AC) power source VAC and includes a power conversion circuit 10, a control circuit 12, and a plurality of illuminant system 14; each illuminant system 14 includes one or more LED strings 16 and an LED driving apparatus 18. A user may send control data to the control circuit 12 by using a computer 3 for varying the color (and intensity) of the illuminant systems 14.

The power conversion circuit 10 is electrically connected to the AC power source VAC and configured to convert AC electricity supplied by the AC power source VAC into direct current (DC) electricity; the DC electricity is supplied to the control circuit 12 and the illuminant systems 14. The control circuit 12 may convert the control data into one or more illuminant-control signal for signal transmission. The illuminant-control signal is a pulse-width-modulation signal and the illuminant-control signal is sent to the illuminant system 14 with the same transmission line sending the DC electricity.

Figure 2:
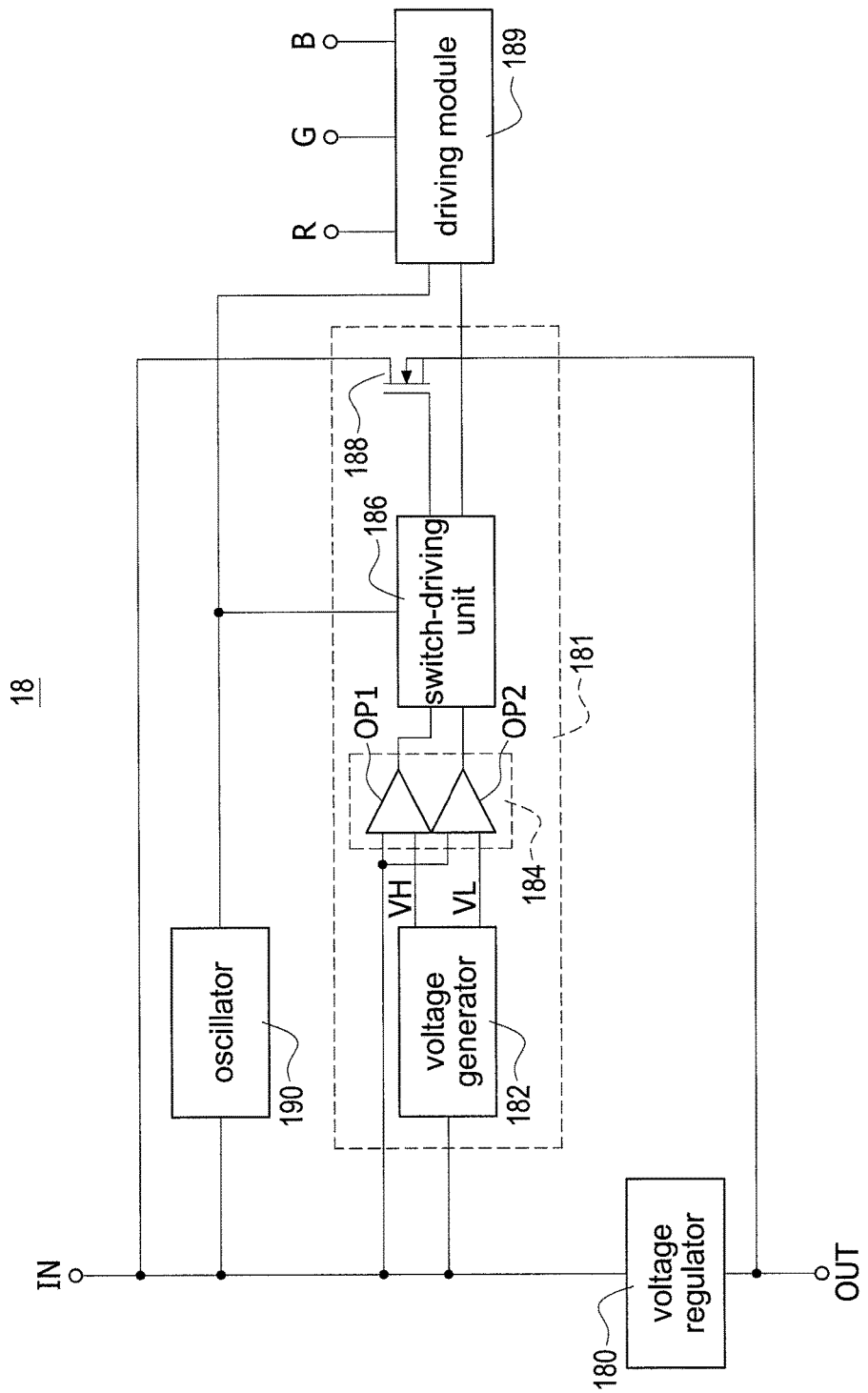
FIG. 2 is a circuit block diagram of an LED driving apparatus according to a 1st embodiment of the present disclosure.

Reference is made to FIG. 2, which is a circuit block diagram of an LED driving apparatus according to the 1st embodiment of the present disclosure. In FIG. 2, the LED driving apparatus 18 includes an input terminal IN and an output terminal OUT; the input terminal IN is a terminal for receiving the DC electricity and the illuminant-control signal from preceding stage circuit, and the output terminal OUT is a terminal for sending the DC electricity and the illuminant-control signal to the next illuminant system 14. More particularly, for the first illuminant system 14 shown in FIG. 1 (i.e., the illuminant system 14 directly connected to the control circuit 12), the input terminal IN is the terminal for receiving the DC electricity and the illuminant-control signal from the control circuit 12; for the second illuminant system 14 shown in FIG. 2 (i.e., the illuminant system 14 directly connected to the first illuminant system 14), the input terminal IN is the terminal for receiving the DC electricity and the illuminant-control signal from the pre-stage illuminant system 14 (i.e., the first illuminant system 14) and so on; the output terminal OUT is the terminal for sending the DC electricity and the illuminant-control signal to the next illuminant system 14.

With referring again to FIG. 2; the LED driving apparatus 18 includes a voltage regulator 180, a signal-adjusting module 181, a driving module 189, and an oscillator 190; the input terminal IN is electrically connected to the output terminal OUT via the voltage regulator 180. The DC electricity is conducted to the voltage regulator 180 from the input terminal IN, and voltage regulator 180 is configured to supply a DC voltage to the modules and components of the LED driving apparatus 18.

The signal-adjusting module 181 includes a voltage generator 182, a level-comparing unit 184, a switch-driving unit 186, and a switch 188; the voltage generator 182, the level-comparing unit 184, and the switch-driving unit 186 collectively constitute a switch-control unit (its reference numeral is omitted) configured to turn on or off the switch 188. The voltage generator 182 is electrically connected to the voltage regulator 180. The voltage generator 182 receives the DC voltage provided by the voltage regulator 180 and configured to generate a first threshold voltage VH and a second threshold voltage VL; the level of the first threshold voltage VH (hereafter referred to as a first threshold level) is greater than the level of the second threshold voltage VL (hereafter referred to as a second threshold level).

The level-comparing unit 184 is electrically connected to the input terminal IN, the voltage regulator 180, and the voltage generator 182. The level-comparing unit 184 is configured to compare the illuminant-control signal with the first threshold voltage VII and generate a first signal when the level of the illuminant-control signal reaches the first threshold level. The level-comparing unit 184 is further configured to compare the illuminant-control signal with the second threshold voltage VL and generate a second signal when the level of the illuminant-control signal reaches the second threshold level.

Figure 3:
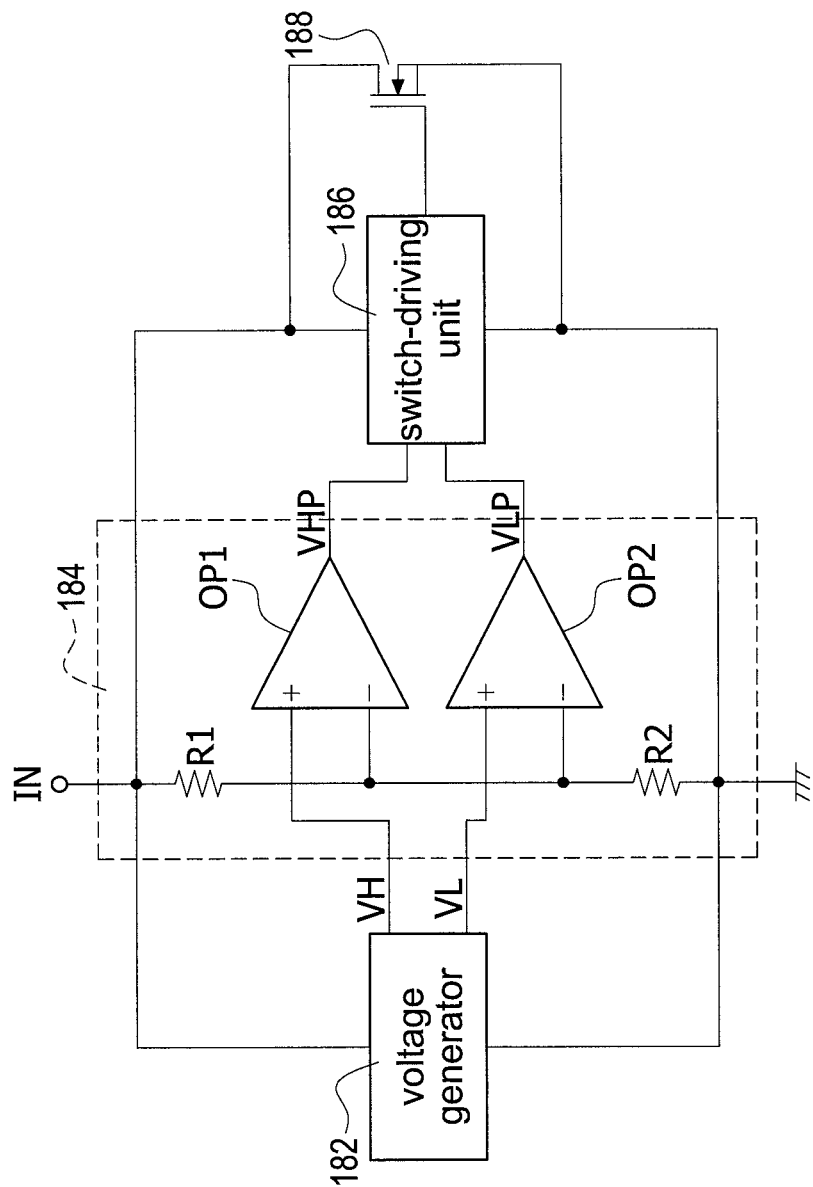
FIG. 3 is a circuit diagram of a level comparing unit according to the 1st embodiment of the present disclosure.

Reference is made to FIG. 3, which is a circuit diagram of a level comparing unit according to the 1st embodiment of the present disclosure. For purpose of convenience of discussion, FIG. 3 further illustrates the input terminal IN, the voltage generator 182, the switch-driving unit 186, and the switch 188. The level-comparing unit 184 includes a first resistor R1, a second resistor R2, a first operational amplifier OP1, and a second operational amplifier OP2; inverting inputs of the first operational amplifier OP1 and the second operational amplifier OP2 are not only electrically connected to the input terminal IN for receiving the illuminant-control signal via the first resistor R1 but also electrically connected to ground via the second resistor R2. The switch-driving unit 186 is electrically connected to the switch 188. The non-inverting input of the first operational amplifier OP1 is electrically connected to the voltage regulator 182 for receiving the first threshold voltage VH provided by the voltage generator 182; the non-inverting input of the second operational amplifier OP2 is electrically connected to the voltage generator 182 for receiving the second threshold voltage VL provided by the voltage generator 182. The switch 188 is an n channel transistor switch.

Figure 4A:
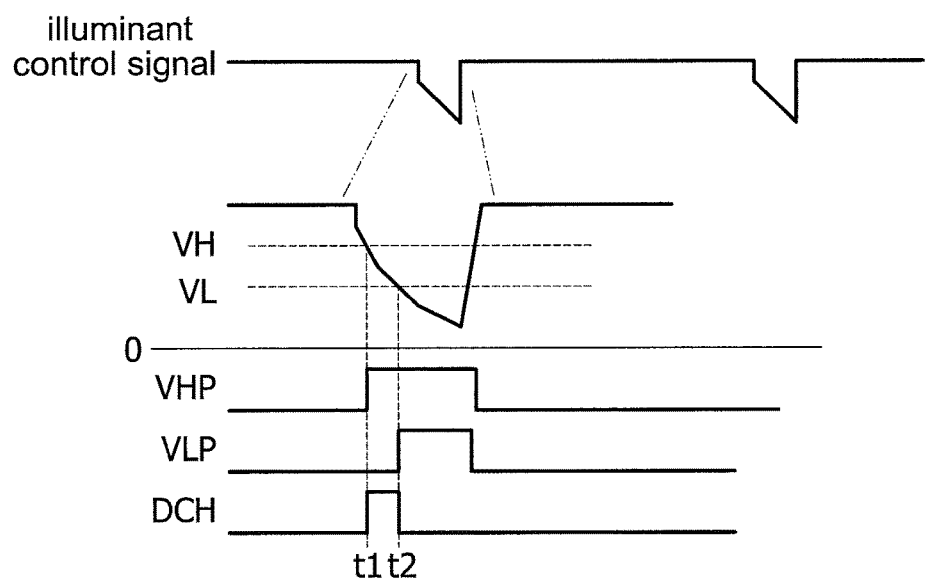
FIG. 4A is a waveform diagram of an illuminant-control signal, a first signal, a second signal, and the switch-driving signal illustrated in FIG. 3.

FIG. 4A is a waveform diagram of an illuminant-control signal, a first signal, a second signal, and the switch-driving signal illustrated in FIG. 3. As can be seen in FIG. 4A, the illuminant-control signal is a pulse-width-modulation signal (hereinafter referred to as a PWM signal) having an upper limit level and a lower limit level. In the present disclosure, a single pulse period starts at a boundary in which the PWM signal transition from the upper limit level to the lower limit level, and ends at another boundary in which the PWM signal transition from the lower limit level to the upper limit level. In the past, when the LED string 16 includes a large number of LEDs electrically connected in series, the parasitic capacitance on the line may induce a longer period of a high-to-low transition. The LED driving apparatus 18 includes the switch-control unit and the switch 188; the switch-control unit and the switch 188 are arranged between the input terminal IN and the output terminal OUT, and the switch-control unit is configured to turn on the switch 188 when the level of the illuminant-control signal is between the first threshold level and the second threshold level, thus shortening the period of the high-to-low transition.

In FIG. 3, the first operational amplifier OP1 is configured to compare the level of the illuminant-control signal with the first threshold level and generate a first signal VHP when the level of the illuminant-control signal reaches the first threshold level (as time point t1 shown in FIG. 4A). The switch-control unit 186 receives the first signal VHP and outputs a switch-driving signal DCH having a logic high level in response to the first signal VHP to drive the switch 188 to turn on so as to increase the high-to-low transition speed of the illuminant-control signal.

The second operational amplifier OP2 is configured to compare the level of the illuminant-control signal with the second threshold level and generate a second signal VLP when the level of the illuminant-control signal reaches the second threshold level (as time point t2 shown in FIG. 4A). The switch-driving unit 186 further receives the second signal and outputs the switch-driving signal DCH having a logic low level in response to the second signal VLP to drive the switch 188 to turn off so as to stop increasing the high-to-low transition speed of the illuminant-control signal and decrease power consumption.

Figure 4B:
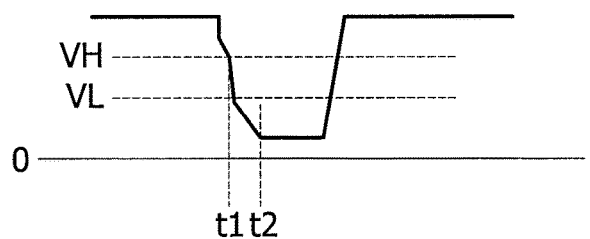
FIG. 4B is a waveform diagram of an illuminant control signal of the LED driving apparatus illustrated in FIG. 2.

In summary, between time points t1 and t2 shown in FIG. 4A, the switch 188 turns on since the switch-driving signal DCH is high. Once the switch 188 is turned on, the level of the illuminant-control signal goes low fast (as shown in FIG. 4B), decreasing the high-to-low transition time. Therefore, a fast high-to-low transition speed of the illuminant-control signal is provided.

With referring again to FIG. 2; the driving module 189 is electrically connected to the signal-adjusting module 181 and the oscillator 190. The driving module 189 receives the illuminant-control signal outputted from the signal-adjusting module 181 and drives the LED strings 16 connected to the output terminals R, G, and B to vary color (and intensity). The oscillator 190 is further electrically connected to the voltage regulator 180 and the switch-driving unit 186.

Figure 5:
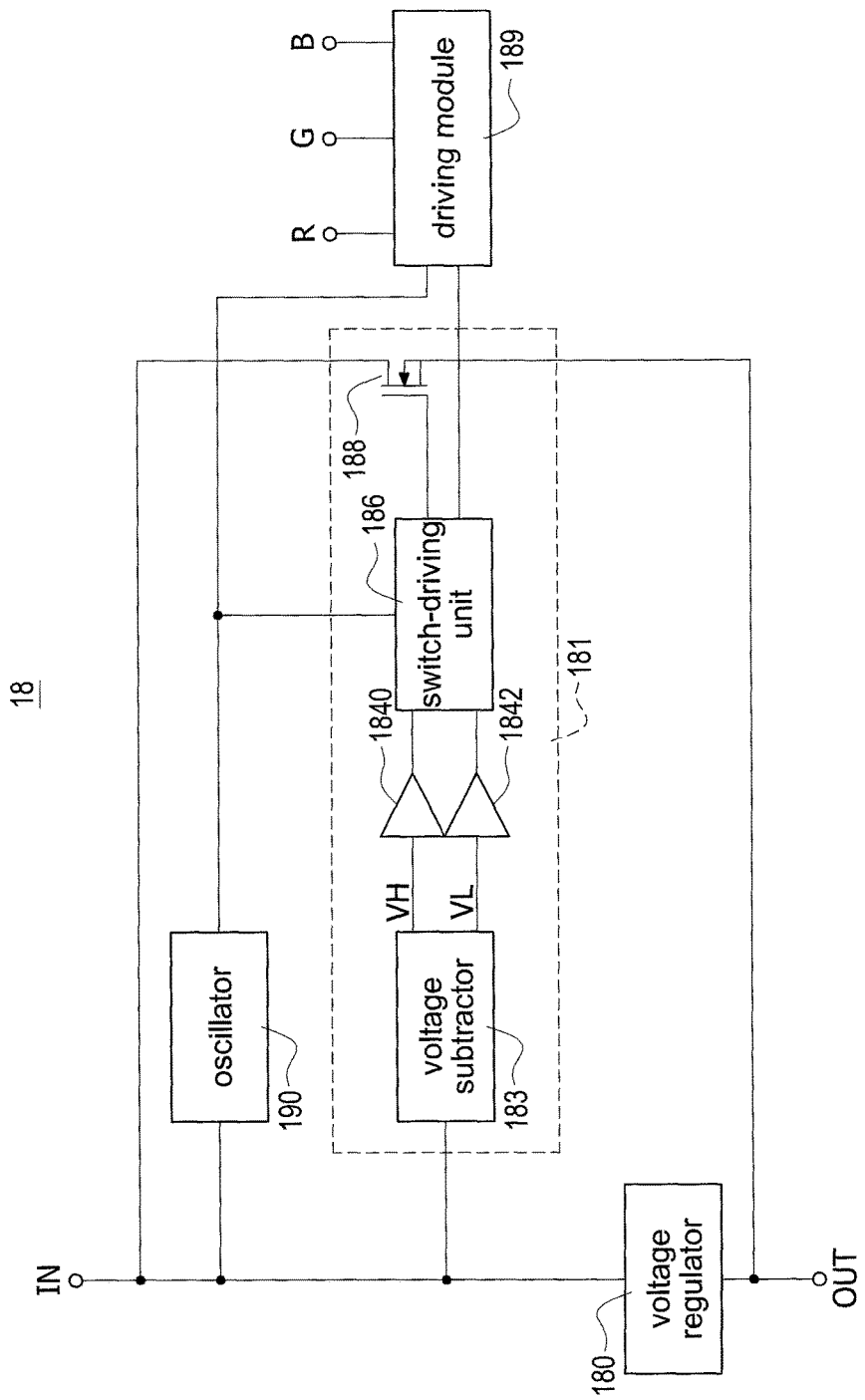
FIG. 5 is a circuit block diagram of an LED driving apparatus according to a 2nd embodiment of the present disclosure.

Reference is made to FIG. 5, which is a circuit block diagram of an LED driving apparatus according to a 2nd embodiment of the present disclosure. The LED driving apparatus 18 includes a voltage regulator 180, a signal-adjusting module 181, a driving module 189, and an oscillator 190; the signal-adjusting module 181 includes a voltage subtractor 183, a plurality of buffers 1840 and 1842, a switch-driving unit 186, and a switch 188. The voltage subtractor 183 is electrically connected to the input terminal IN and the voltage regulator 180; the voltage subtractor 183 receives the illuminant-control signal and a DC voltage provided by the voltage regulator 180 and configured to generate a first threshold voltage VH and a second threshold voltage VL. The buffers 1840 and 1842 are arranged between the voltage subtractor 183 and the switch-driving unit 186 and electrically connected thereto; the buffers 1840 and 1842 are configured to conduct the first threshold voltage VH and the second threshold voltage VL to the switch-driving unit 186.

The voltage subtractor 183 may output the first signal VHP (as shown in FIG. 4A) to the switch-driving unit 186 when the level of the illuminant-control signal reaches the level of the first threshold voltage VH. The switch-control unit 186 receives the first signal VHP and outputs the switch-driving signal DCH having a logic high level in response to the first signal VHP to turn on the switch 188; thus increasing the high-to-low transition speed of the illuminant-control signal. The voltage subtractor 183 may output the second signal VLP (as shown in FIG. 4A) to the switch-driving unit 186 when the level of the illuminant-control signal reaches the level of the second threshold voltage VL. The switch-driving unit 186 receives the second signal and outputs the switch-driving signal DCH having a logic low level in response to the second signal VLP to turn off the switch 188, thus stopping increasing the high-to-low transition speed of the illuminant-control signal. As a result, the high-to-low transition time of the illuminant-control signal is decreased.

The function and relative description of the voltage regulator 180, the driving module 189, and the oscillator 190 shown in FIG. 5 are the same as that shown in FIG. 2 mentioned above and are not repeated here for brevity, and LED driving apparatus 18 shown in FIG. 5 can achieve the functions as the LED driving apparatus 18 shown in FIG. 2 does.

Figure 6:
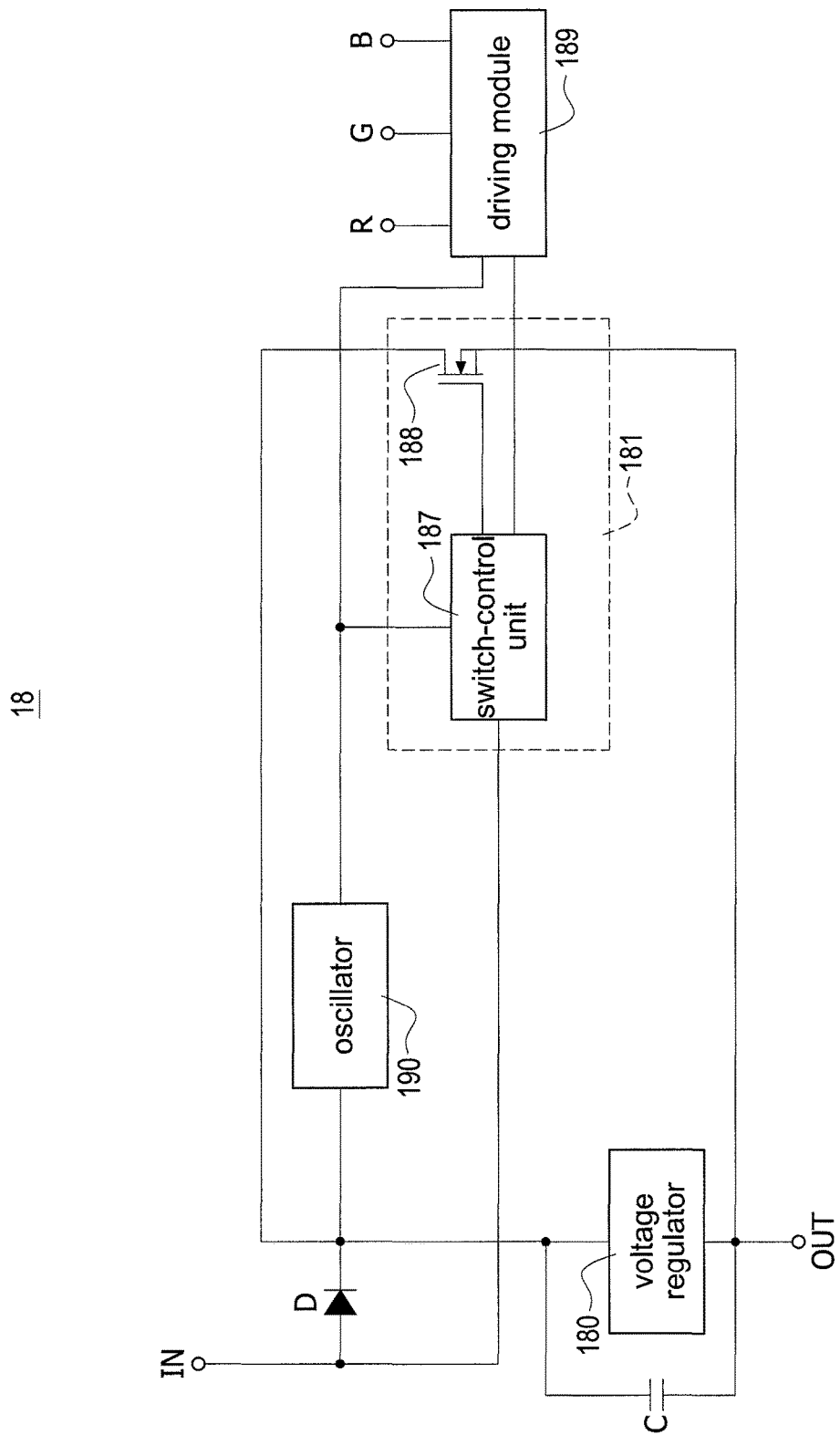
FIG. 6 is a circuit block diagram of an LED driving apparatus according to a 3rd embodiment of the present disclosure.

Reference is made to FIG. 6, which is a circuit block diagram of an LED driving apparatus according to a 3rd embodiment of the present disclosure. In FIG. 6, the LED driving apparatus 18 includes an input terminal IN, an output terminal OUT, a voltage regulator 180, a signal-adjusting module 181, a driving module 189, and an oscillator 190. The input terminal IN is electrically connected to the output terminal OUT via a diode D and the voltage regulator 180. One terminal of a capacitor C is electrically connected to the input terminal IN via the diode D, and the other terminal thereof is connected to the output terminal OUT. The anode of the diode D is connected to the input terminal IN and the cathode thereof is connected to the voltage regulator 180 and the capacitor C. The oscillator 190 is connected to the cathode of the diode D.

Figure 7A:
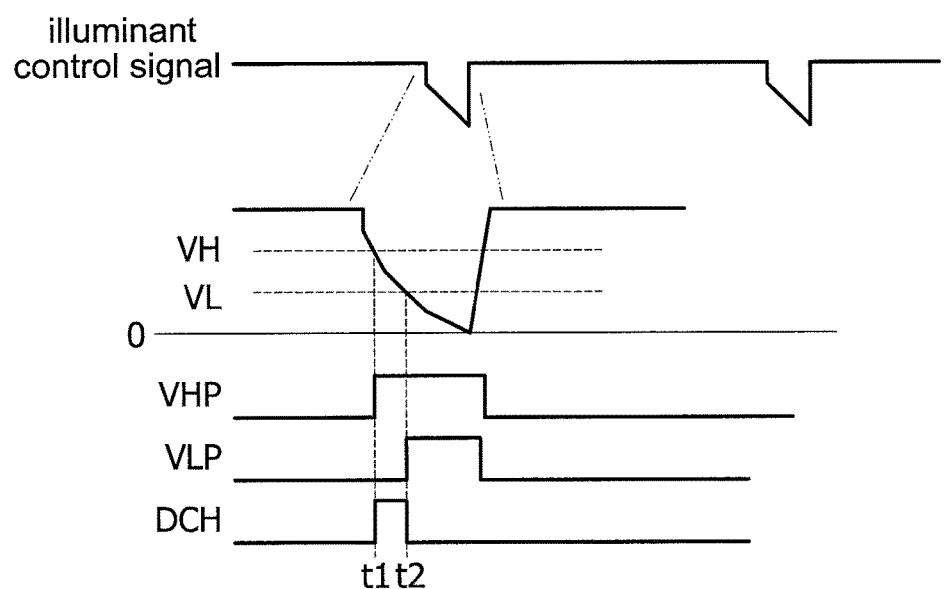
FIG. 7A is a waveform diagram of an illuminant-control signal, a first signal, a second signal, and the switch-driving signal of the LED driving apparatus illustrated in FIG. 6.
Figure 7B:
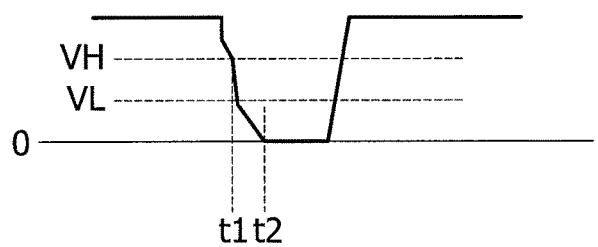
FIG. 7B is a waveform diagram of an illuminant control signal of the LED driving apparatus illustrated in FIG. 6.

The signal-adjusting module 181 includes a switch-control unit 187 and a switch 188 electrically connected to the input terminal IN, the output terminal OUT, and a switch-control unit 187. The switch-control unit 187 receives an illuminant-control signal from the input terminal IN and configured to adjusting the waveform of the illuminant-control signal. The illuminant-control signal is a pulse-width-modulation signal having an upper limit level and a lower limit level, and the lower limit level is, for example, zero (as shown in FIG. 7A).

The switch-control unit 186 in configured to output a switch-driving signal DCH having a logic high level (as time point t1 shown in FIG. 7A) when the illuminant-control signal reaches a level of a first threshold voltage VH to turn on the switch 188. The switch-driving unit 186 is further configured to output the switch-driving signal DCH having a logic low level (as time point t2 shown in FIG. 7A) when the illuminant-control signal reaches a level of a second threshold voltage VL to turn off the switch 188. The level of the first threshold voltage VH is greater than that of the second threshold voltage VL. As a result, the high-to-low transition time of the illuminant-control signal is decreased. The function and relative description of the voltage regulator 180, the driving module 189, and the oscillator 190 shown in FIG. 6 are the same as that shown in FIG. 2 mentioned above and are not repeated here for brevity, and LED driving apparatus 18 shown in FIG. 6 can achieve the functions as the LED driving apparatus 18 shown in FIG. 2 does.

Additionally, as used herein, the term "module" refers to (a) hardware-only circuit implementations (e.g., implementations in analog circuitry and/or digital circuitry); and (b) circuits, such as, for example, an integrated circuit(s) or a portion of an integrated circuit(s). This definition of "module" applies to all uses of this term herein, including in any claims.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A signal-adjusting module, applied to a light emitting diode driving apparatus and electrically connected to a control circuit for generating an illuminant-control signal, the signal-adjusting module comprising:
    an input terminal electrically connected to the control circuit;
    an output terminal electrically connected to light emitting diode driving apparatus;
    a switch-control unit comprising a level-comparing unit electrically connected to the input terminal for receiving the illuminant-control signal and having a first threshold level and a second threshold level, wherein the illuminant-control signal is a pulse-width-modulation signal transiting from a first limit level to a second limit level; and
    a switch electrically connected to the input terminal, the output terminal, and the switch-control unit,
    wherein the level-comparing unit is configured to compare a level of the illuminant-control signal with the first threshold level and generate a first signal as a basis for turning on the switch when the level of the illuminant-control signal reaches the first threshold level, and
    wherein the level-comparing unit is configured to generate a second signal as a basis for turn off the switch after passing a time interval when generating the first signal.

2. The signal-adjusting module of claim 1, wherein the switch-control unit further comprises:
    a switch-driving unit electrically connected to the switch; and a voltage subtractor electrically connected to the switch-driving unit and configured to generate a first threshold voltage with first threshold level and a second threshold voltage with the second threshold level.

3. The signal-adjusting module of claim 2, wherein the switch-control unit further comprises a plurality of buffers arranged between the voltage subtractor and the switch-driving unit and electrically to the voltage subtractor and the switch-driving unit, the buffers are configured to conduct the first threshold voltage and the second threshold voltage provided by the voltage subtractor to the switch-driving unit.

4. The signal-adjusting module of claim 1, wherein the switch-control unit further comprises:
a switch-driving unit electrically connected to the switch and the level comparing unit; and
a voltage generator electrically connected to the input terminal and configured to generate a first threshold voltage with the first threshold level and a second threshold voltage with the second threshold level;
wherein the level-comparing unit is further configured to compare the level of the illuminant-control signal with the second threshold voltage and generate the second signal as a basis for turning off the switch when the level of the illuminant-control signal reaches the second threshold level, and
wherein the level-comparing unit provides the first signal to the switch-driving unit when the level of illuminant-control signal reaches the first threshold level and provides the second signal to the switch-driving unit when the level of the illuminant-control signal reaches the second threshold level, and the switch-driving unit is configured to turn on the switch when receiving the first signal and turn off the switch when receiving the second signal.

5. The signal-adjusting module of claim 4, wherein the level-comparing unit comprising:
a first resistor electrically connected to the input terminal for receiving the illuminant-control signal;
a second resistor electrically connected to the first resistor in series;
a first operational amplifier (OPA), wherein one input of the first OPA is electrically connected to the voltage generator for receiving the first threshold voltage, and the other input of the first OPA is electrically connected to a node between the first resistor and the second resistor; and
a second OPA, wherein one input of the second OPA is electrically connected to the voltage generator for receiving the second threshold voltage, and the other input of the second OPA is electrically connected to the node between the first resistor and the second resistor,
wherein an output of the first OPA connected to the switch-driving unit sends the first signal when the level of the illuminant-control signal reaches the first threshold voltage, and an output of the second OPA connected to the switch-driving unit sends the second signal when the level of the illuminant-control signal reaches the second threshold voltage.

6. The signal-adjusting module of claim 1, wherein the switch is an n channel transistor switch.

7. The light emitting diode driving apparatus of claim 1, wherein the switch-control unit is configured to turn off the switch when the level of the illuminant signal reaches a second threshold level different from the first threshold level.

8. The light emitting diode driving apparatus of claim 7, wherein the first limit level is greater than the second limit level, the first threshold level and the second threshold level are between the first limit level and the second limit level, and the first threshold level is greater than the second threshold level.

9. A light emitting diode driving apparatus, receiving an illuminant-control signal transiting from a first limit level to a second limit level and configured to vary color of a plurality of light emitting diode strings, the light emitting diode driving apparatus comprising:
a signal-adjusting module comprising:
an input terminal for receiving the illuminant-control signal;
an output terminal;
a switch-control unit comprising a level-comparing unit electrically connected to the input terminal and having a first threshold level and a second threshold level, wherein the switch-control unit receives the illuminant-control signal and configured to determine a level of the illuminant-control signal; and
a switch electrically connected to the input terminal, the output terminal, and the switch-control unit, wherein the switch-control unit is configured to compare the level of the illuminant-control signal with the first threshold level and generate a first signal as a basis for turning on the switch when the level of the illuminant-control signal reaches the first threshold level, and the switch-control unit is further configured to compare the level of the illuminant-control signal with the second threshold level and generate a second signal as a basis for turning off the switch after passing a time interval when generating the first signal;
a voltage regulator electrically connected to the input terminal and the output terminal; and
a driving module electrically connected to the signal-adjusting module and the light emitting diode strings.

10. The signal-adjusting module of claim 9, further comprising:
an oscillator;
a diode electrically connected to the input terminal, the oscillator, the voltage regulator, and the driving module; and
a capacitor, the input terminal is electrically connected to the output terminal via the capacitor.

11. The light emitting diode driving apparatus of claim 9, wherein the switch-control unit further comprising:
a switch-driving unit electrically connected to the switch; and
a voltage subtractor electrically connected to the switch-driving unit and configured to generate a first threshold voltage with the first threshold level and a second threshold voltage with the second threshold level.

12. The light emitting diode driving apparatus of claim 11, wherein the switch-control unit further comprising a plurality of buffers arranged between the voltage subtractor and the switch-driving unit and electrically to the voltage subtractor and the switch-driving unit, the buffers are configured to conduct the first threshold voltage and the second threshold voltage provided by the voltage subtractor to the switch-driving unit.

13. The light emitting diode driving apparatus of claim 9, wherein the switch-control unit further comprising:
a switch-driving unit electrically connected to the switch;
a voltage generator electrically connected to the input terminal and configured to generate a first threshold voltage with the first threshold level and a second threshold voltage with the second threshold level; and wherein the level-comparing unit is further configured to compare the level of the illuminant-control signal with the second threshold voltage and generate the second signal as a basis for turning off the switch when the level of the illuminant-control signal reaches the second threshold level, and wherein the level-comparing unit provides the first signal to the switch-driving unit when the level of illuminant-control signal reaches the first threshold level and provides the second signal to the switch-driving unit when the level of the illuminant-control signal reaches the second threshold level, and the switch-driving unit is configured to turn on the switch when receiving the first signal and turn off the switch when receiving the second signal.

14. The light emitting diode driving apparatus in claim 13, wherein the level-comparing unit comprising:
a first resistor electrically connected to the input terminal and receiving the illuminant-control signal;
a second resistor electrically connected to the first resistor in series;
a first operational amplifier (OPA), wherein one input of the first OPA is electrically connected to the voltage generator for receiving the first threshold voltage, the other input of the first OPA is electrically connected to a node between the first resistor and the second resistor; and a second OPA, wherein an input of the second OPA is electrically connected to the voltage generator for receiving the second threshold voltage, the other input of the second OPA is electrically connected to the node between the first resistor and the second resistor, wherein an output of the first OPA connected to the switch-driving unit sends the first signal when the level of the illuminant-control signal reaches the first threshold voltage, and an output of the second OPA connected to the switch-driving unit sends the second signal when the level of the illuminant-control signal reaches the second threshold voltage.

15. The light emitting diode driving apparatus of claim 9, wherein the switch is an n channel transistor switch.

16. The light emitting diode driving apparatus of claim 9, wherein the switch-control unit is configured to turn off the switch when the level of the illuminant signal reaches a second threshold level different from the first threshold level.

17. The light emitting diode driving apparatus of claim 16, wherein the first limit level is greater than the second limit level, the first threshold level and the second threshold level are between the first limit level and the second limit level, and the first threshold level is greater than the second threshold level.

* * * * *